(12) United States Patent
Hofmann et al.

(10) Patent No.: US 12,188,819 B2
(45) Date of Patent: Jan. 7, 2025

(54) SPECTROMETER HAVING A SUPPORT PLATE AND HAVING A HOUSING

(71) Applicant: CARL ZEISS JENA GMBH, Jena (DE)

(72) Inventors: Jens Hofmann, Jena (DE); Dirk Dobermann, Weimar (DE); Michael Barth, Erfurt (DE)

(73) Assignee: CARL ZEISS JENA GMBH, Jena (DE)

(*) Notice: Subject to any disclaimer, the term of this patent is extended or adjusted under 35 U.S.C. 154(b) by 205 days.

(21) Appl. No.: 18/016,084

(22) PCT Filed: Jul. 5, 2021

(86) PCT No.: PCT/EP2021/068433
§ 371 (c)(1),
(2) Date: Jan. 13, 2023

(87) PCT Pub. No.: WO2022/012983
PCT Pub. Date: Jan. 20, 2022

(65) Prior Publication Data
US 2023/0273068 A1  Aug. 31, 2023

(30) Foreign Application Priority Data
Jul. 16, 2020  (DE) .................... 10 2020 118 822.6

(51) Int. Cl.
*G01J 3/28* (2006.01)
*G01J 3/02* (2006.01)
(Continued)

(52) U.S. Cl.
CPC ............. *G01J 3/28* (2013.01); *G01J 3/0202* (2013.01); *G01J 3/0291* (2013.01); *G01J 3/04* (2013.01); *G01J 3/18* (2013.01)

(58) Field of Classification Search
CPC .......... G01J 3/0202; G01J 3/0291; G01J 3/04; G01J 3/18; G01J 3/28
See application file for complete search history.

(56) References Cited

U.S. PATENT DOCUMENTS

2004/0239931 A1   12/2004   Teichmann
2006/0139636 A1*   6/2006   Kerstan ................. G01J 3/0291
                                              356/328

FOREIGN PATENT DOCUMENTS

DE           10304312 A1     8/2004
DE      102007045668 A1     4/2009
(Continued)

OTHER PUBLICATIONS

Anonymous, "Kinematic Coupling—Wikipedia" Apr. 4, 2020.

*Primary Examiner* — Hina F Ayub
(74) *Attorney, Agent, or Firm* — Stuart H. Mayer; Kaplan Breyer Schwarz LLP

(57) ABSTRACT

The present invention relates to a spectrometer for spectral analysis of electromagnetic radiation. The spectrometer comprises an entry slit for entry of the electromagnetic radiation to be analysed and an imaging grating for diffraction of the electromagnetic radiation which has entered. The spectrometer additionally comprises a detector extending at least in one direction to detect the diffracted electromagnetic radiation, and also a support plate in which the entry slit is located. The spectrometer further comprises a housing which is mounted on the support plate, covers the detector and the entry slit and supports the imaging grating. According to the invention the spectrometer further comprises at least three floating bearings for floating mounting of the housing on the support plate, the floating bearings each enabling a displacement between the housing and the support plate on a directional axis and being distributed about a central axis of the housing.

15 Claims, 2 Drawing Sheets

(51) Int. Cl.
*G01J 3/04* (2006.01)
*G01J 3/18* (2006.01)

(56) References Cited

FOREIGN PATENT DOCUMENTS

DE 102016005386 A1 11/2017
EP 1041372 A1 10/2000

* cited by examiner

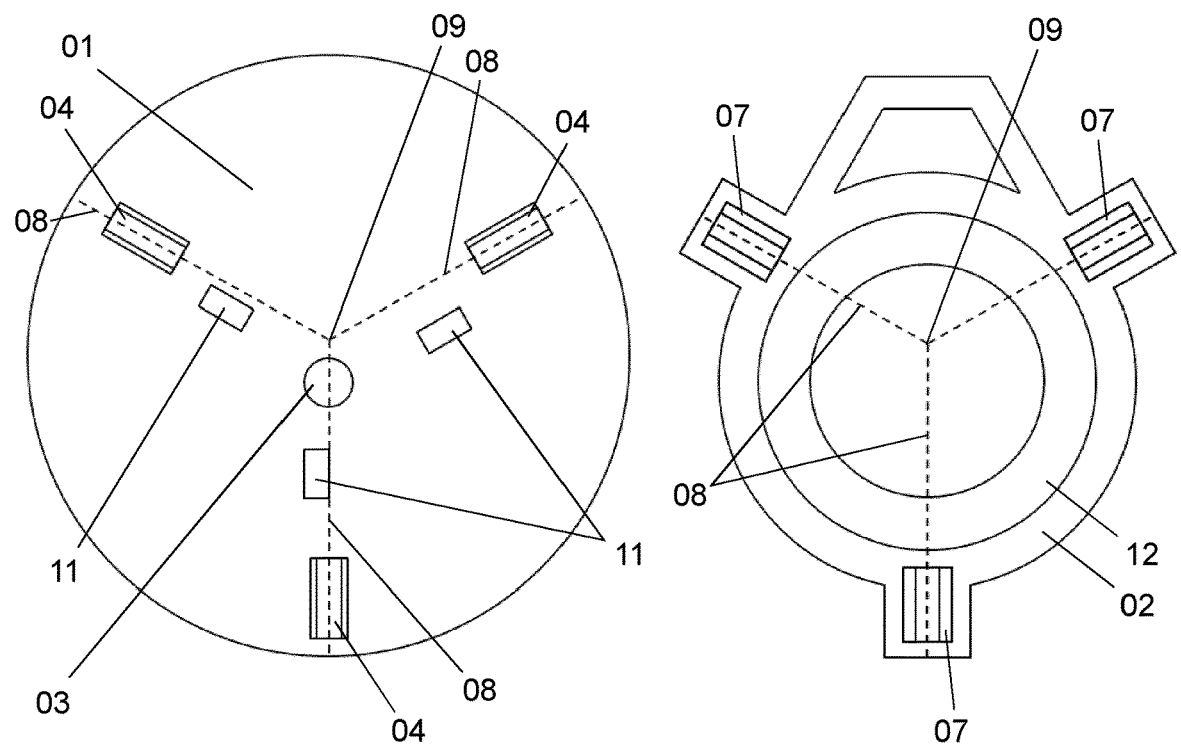
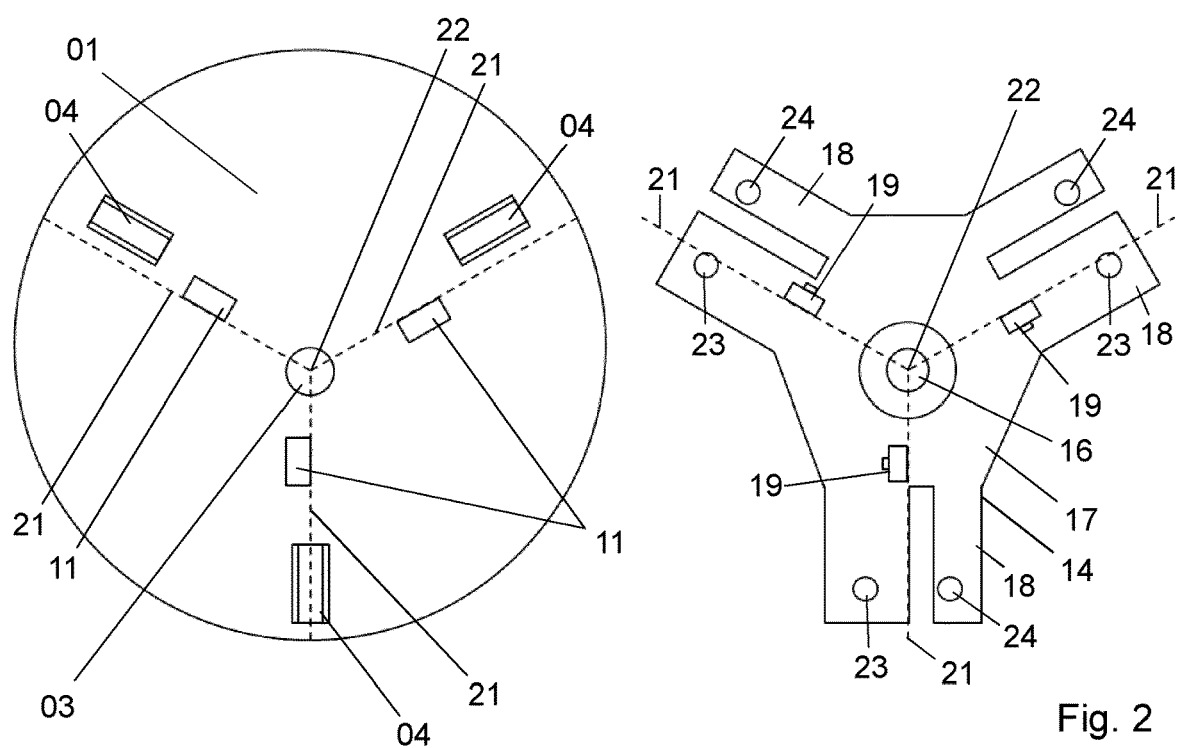

SPECTROMETER HAVING A SUPPORT PLATE AND HAVING A HOUSING

BACKGROUND OF THE INVENTION

The present invention relates to a spectrometer comprising a support plate and a housing mounted on the support plate. The housing supports an imaging grating. A detector extending at least in one direction is arranged in the housing. Such spectrometers are also referred to as compact spectrometers.

Since spectrometers are sensitive measuring instruments, the prior art already discloses solutions for making spectrometers resistant to environmental influences, such as temperature fluctuations. In this regard, materials are used, for example, which have no or only little thermal expansion. Moreover, solutions for compensating for a change in length in the event of thermal expansion are known. Particularly in the case of mass produced spectrometers in compact embodiments, use is made of plastics parts, such as housings composed of plastic, for example. These plastics, usually formed by polymers, generally have large thermal expansion. Other components of the spectrometers, such as support plates composed of steel, for example, have significantly smaller thermal expansion. The different thermal expansions require special measures for compensation.

DE 103 04 312 A1 discloses a spectrometer in which the electrical and optical components are connected to one another in a compact design. By way of a small number of individual parts, the intention is to attain a minimum outlay in respect of mounting and alignment. The compact spectrometer consists of an entrance slit, an imaging grating, one or more detector elements arranged in linear or matrix-shaped fashion, and elements of a control and evaluation unit. The detector elements and the entrance slit are situated on a common support, on the free surfaces of which the elements of the control and evaluation unit are arranged. The entrance slit and the detector elements, and also the spherical imaging grating incorporated in the spectrometer housing, are arranged symmetrically with respect to an imaginary center axis of the support. The compact spectrometer comprises at least one fixed bearing and one floating bearing for the mounting of the spectrometer housing on the support.

U.S. Pat. No. 6,650,412 B1 discloses a possibility for passive thermal compensation in optical apparatuses, such as spectrometers, for example. The thermal compensation is intended to be effected both at the focus parallel to the optical axis and in a lateral position perpendicular to the optical axis. In order to maintain the position of a lens, along the optical axis at least two polymer spacers are used between a lens mount and a floating flange to which the lens is attached. The polymer spacers have a coefficient of thermal expansion such that when the temperature increases the lens is moved in the direction of a detector array by the spacers in order to compensate for the temperature-dictated increase in the distance between the lens and the detector. Flexure mounts, which bend by a predetermined amount in one direction when the temperature changes, are used to connect the lens mount to the floating plate. The lens is thereby moved in a direction laterally with respect to the optical axis.

US 2004/0239931 A1 discloses a spectrometer which is configured using a photodetector. The photodetector comprises a photodiode array having a plurality of photodiodes and a light input section including an opening formed in a predetermined positional relationship to the photodiode array. A reflection diffraction grating serves to separate incident light into its spectral components. The spectral components are detected by the photodiode array.

DE 10 2016 005 386 A1 discloses a spectrometer for examining the spectrum of an optical emission source. The spectrometer comprises a main optical body, a light entrance opening fixedly connected to the main optical body, a dispersion element for generating a spectrum, and a detector for measuring the generated spectrum. A mirror group having two mirrors is provided between the light entrance opening and the detector, for temperature compensation purposes.

DE 10 2007 045 668 A1 discloses a spectrometer having an entrance slit for admitting measurement light and having a housing. An imaging diffraction grating for splitting and imaging the measurement light onto an optoelectric detector device is arranged in the interior of the housing. The housing and a baseplate are connected to one another by mutually cooperating positioning means for defined mutual positioning. The entrance slit, the positioning means of the baseplate and holding means for receiving and securing the detector device are fixed constituent parts of the baseplate which are fashioned from the baseplate. The positioning means of the baseplate and/or the holding means for the detector device are embodied as resilient elements.

The object of the present invention, proceeding from the prior art, is to provide a compactly constructed spectrometer in which the influence of temperature changes is minimized with little outlay.

SUMMARY OF THE INVENTION

The stated object is achieved by means of a spectrometer as claimed in the attached claim 1.

The spectrometer according to the invention serves for spectral analysis of a sample and is compactly constructed in order to be able to be embodied in particular as a mass producible, miniaturized sensor. The spectrometer according to the invention can be used for example for routine analysis in a laboratory, in process metrology or for quality monitoring in a manufacturing process.

The spectrometer comprises an entrance slit for entrance of electromagnetic radiation to be analyzed into a cavity of the spectrometer. An imaging grating for diffracting the electromagnetic radiation that has entered is situated in said cavity. In addition, a detector for detecting the diffracted electromagnetic radiation is situated in the cavity. The electromagnetic radiation diffracted by the grating is therefore directed onto the detector. The detector extends at least in one direction in order to be able to analyze the electromagnetic radiation diffracted by the grating. The detector is embodied for example as a linear detector or as a matrix detector. The spectrometer preferably also comprises a control and evaluation unit besides the grating and the detector.

The spectrometer comprises a support plate, in which the entrance slit is arranged and which supports preferably the detector and preferably also a printed circuit board. A housing of the spectrometer is mounted on the support plate. The housing encloses the cavity described above. The housing covers or envelops the detector and the entrance slit. The housing supports the imaging grating. The imaging grating can be embodied for example as a cover of the housing. The imaging grating can for example also be attached to an interior side of the housing.

The spectrometer comprises at least three floating bearings for floating mounting of the housing on the support plate. The mounting is floating insofar as thermally dictated expansion of the housing relative to the support plate is enabled. Moreover, the mounting is completely determined, such that the housing cannot be moved relative to the support plate. In particular, the housing cannot be displaced on the support plate. The position of the housing relative to the support plate is fixed in this respect.

The floating bearings each enable a displacement between the housing and the support plate on a directional axis. The floating bearings preferably each enable the displacement between the housing and the support plate on exactly one directional axis. As a result of the interaction of the at least three floating bearings, the housing can thermally expand relative to the support plate, but the housing cannot be displaced relative to the support plate. For this purpose, the floating bearings are arranged in a manner distributed around a central axis of the housing. Since, as a result of the interaction of the at least three floating bearings, the housing cannot be displaced relative to the support plate, the housing is preferably not mounted on the support plate by means of a fixed bearing or fixed to the support plate in some other way.

One particular advantage of the spectrometer is that the thermally dictated expansion of the housing, which is greater than the thermally dictated expansion of the support plate owing to different materials, does not result in an alteration of the relative positions of the entrance slit, the grating and the detector.

In preferred embodiments of the spectrometer, the housing consists of a plastic, in particular of a polymer or of a thermoplastic. The support plate preferably consists of a ceramic or of a metal, in particular of a steel.

In preferred embodiments of the spectrometer, the directional axes of at least two of the floating bearings intersect at an intersection point. Preferably, the directional axes of all of the floating bearings intersect at the intersection point. The directional axes preferably lie in a plane, this plane preferably being aligned parallel to the support plate and preferably lying in the support plate. The intersection point of the directional axes of the at least two of the floating bearings preferably also lies in this plane. The intersection point forms a virtual fixed bearing. The intersection point is preferably arranged in the support plate. The intersection point is preferably covered or enclosed by the housing.

The intersection point of the directional axes of the at least two of the floating bearings preferably lies in the entrance slit. The intersection point of the directional axes of the at least two of the floating bearings alternatively preferably lies in the plane of the support plate in a manner spaced apart from the entrance slit by an offset measure. The offset measure is smaller than one quarter of a radius of the housing.

The housing preferably has a tubular shape or a pot shape. A central axis of the housing, in particular of the tubular shape or pot shape, is preferably aligned perpendicular to the support plate. The tubular housing is preferably closed by the support plate on a first side surface of the tubular housing, while a second side surface of the tubular housing situated opposite the first side surface is closed by the grating. The grating is preferably arranged in a plane arranged parallel to the support plate. The grating is alternatively preferably arranged in a plane arranged in a manner tilted by a tilt angle relative to the support plate, the tilt angle being preferably less than 15°; preferably between 5° and 10°. This plane is preferably arranged perpendicular to the central axis of the housing. Insofar as the housing is pot-shaped, the grating is preferably arranged on an inner side of a base of the pot shape. The tubular or pot-shaped housing has a main body with the shape of a hollow cylinder or with the shape of a hollow truncated cone. The grating is preferably formed by a spherical grating.

The directional axis of at least one of the floating bearings preferably intersects the central axis of the housing. In further preferred embodiments, the directional axes of all of the floating bearings intersect the central axis of the housing. The intersection point at which the directional axes of all of the floating bearings intersect is alternatively preferably spaced apart from the central axis of the housing by the offset measure. The offset measure is smaller than one quarter of a radius of the housing.

The floating bearings are preferably arranged outside the housing. The floating bearings are preferably at an identical distance from the intersection point of the directional axes. The floating bearings are preferably at an identical distance from the central axis of the housing.

The floating bearings are preferably arranged in a manner distributed uniformly around the intersection point of the directional axes. The floating bearings are preferably arranged in a manner distributed uniformly around the central axis of the housing. Preferably, one of the floating bearings is arranged offset from the uniform distribution by at most a coding distance from the uniform distribution, such that the mounting of the housing on the support plate is unmistakable.

Preferably, the spectrometer comprises exactly three of the floating bearings. Two of the three floating bearings in each case have a centre point angle of preferably 120° with respect to one another. The center point angles are alternatively preferably 90°, 90° and 180°, such that two of the three floating bearings lie on a straight line with the intersection point and the directional axes of these two floating bearings lie on a straight line.

In preferred embodiments, the floating bearings enable the displacement between the housing and the support plate in each case on exactly one directional axis. The floating bearings thus each have exactly one degree of freedom.

The floating bearings preferably each comprise a first component embodied in the support plate, such as a groove, for example, which determines the directional axis of the respective floating bearing. The floating bearings preferably each comprise a second component embodied on the housing, such as, for example, a pin to be guided in the respective groove, or a rolling body guide. The second components of the floating bearings are preferably embodied on the periphery of the housing.

In preferred embodiments, the floating bearings are each embodied as a plane bearing. In particularly preferred embodiments, the floating bearings each comprise a groove and a rolling body mounted in the groove, and preferably a rolling body guide. The grooves of the floating bearings are preferably embodied in the support plate. The grooves are preferably embodied in U-shaped or V-shaped fashion. The rolling body guides are preferably embodied on the housing; more particularly on the periphery of the housing. The rolling bodies preferably consist of a steel. The rolling bodies preferably each have the shape of a sphere or a cylinder. The rolling bodies and/or the grooves preferably each have a coating for reducing friction.

The housing is preferably pressed against the support plate by at least one tensioning spring. Consequently, the rolling bodies optionally present are also pressed into the grooves. The at least one tensioning spring is preferably formed by a clip spring.

Preferred embodiments of the spectrometer furthermore comprise an attachment optical unit, which sits upstream of the entrance slit and optically influences the electromagnetic radiation to be analysed; for example by focusing or filtering. The attachment optical unit is arranged on the rear side of the support plate situated opposite the housing. In this respect, the housing is arranged on a front side or top side of the support plate, while the attachment optical unit is arranged on the rear side or underside of the support plate. The attachment optical unit comprises an optical element arranged upstream of the entrance slit and an attachment optical unit support, which supports the optical element. The optical element is formed by a lens element, for example. The attachment optical unit support is mounted on the support plate, namely on the rear side or underside of the support plate. The spectrometer furthermore comprises at least three rear-side floating bearings for floating mounting of the attachment optical unit support on the support plate. In this respect, the three floating bearings for floating mounting of the housing on the support plate each form a front-side floating bearing, while the floating bearings for floating mounting of the attachment optical unit support on the support plate each form a rear-side floating bearing. The mounting is floating insofar as thermally dictated expansion of the attachment optical unit support relative to the support plate is enabled. Moreover, the mounting is completely determined, such that the attachment optical unit support cannot be moved relative to the support plate. In particular, the attachment optical unit support cannot be displaced on the support plate. The position of the attachment optical unit support relative to the support plate and thus also relative to the housing is fixed in this respect.

The rear-side floating bearings each enable a displacement between the attachment optical unit support and the support plate on a directional axis. The rear-side floating bearings are arranged in a manner distributed around a central axis of the attachment optical unit support. The rear-side floating bearings are arranged in a manner distributed preferably uniformly around the central axis of the attachment optical unit support. Preferably, one of the rear-side floating bearings is arranged offset from the uniform distribution by at most a coding distance from the uniform distribution, such that the mounting of the attachment optical unit support on or below the support plate is unmistakable. The central axis of the attachment optical unit support and the central axis of the housing preferably coincide.

The rear-side floating bearings each enable a displacement between the attachment optical unit support and the support plate on a directional axis. The rear-side floating bearings preferably each enable the displacement between the attachment optical unit support and the support plate on exactly one directional axis. As a result of the interaction of the at least three rear-side floating bearings, the attachment optical unit support can thermally expand relative to the support plate, but the attachment optical unit support cannot be displaced relative to the support plate. For this purpose, the rear-side floating bearings are arranged in a manner distributed around a central axis of the attachment optical unit support. Since, as a result of the interaction of the at least three rear-side floating bearings, the attachment optical unit support cannot be displaced relative to the support plate, the attachment optical unit support is preferably not mounted on the support plate by means of a fixed bearing or fixed to the support plate in some other way.

In preferred embodiments of the spectrometer, the attachment optical unit support consists of a plastic, in particular of a polymer or of a thermoplastic.

In preferred embodiments of the spectrometer, the directional axes of at least two of the rear-side floating bearings intersect at an intersection point. Preferably, the directional axes of all of the rear-side floating bearings intersect at the intersection point. The optical element of the attachment optical unit preferably lies at the intersection point. The directional axes preferably lie in a plane, this plane preferably being aligned parallel to the support plate and preferably lying in the support plate. The intersection point of the directional axes of the at least two of the rear-side floating bearings preferably also lies in this plane. The intersection point forms a virtual fixed bearing. The intersection point is preferably arranged in the support plate.

The attachment optical unit support preferably has at least three arms extending in a manner proceeding from the optical element. Each of the rear-side floating bearings preferably supports one of the arms. The arms are preferably arranged in a uniformly distributed manner, such that the angles between each two adjacent arms are of identical magnitude. The attachment optical unit support preferably has exactly three of the arms, the angles between each two adjacent arms being 120°.

The attachment optical unit support preferably comprises a plurality of contact feet, by way of which the attachment optical unit support rests on the support plate. The contact feet are preferably each cylindrical, axes of the cylindrical shapes of the contact feet being arranged perpendicular to the support plate. A plurality of the contact feet are preferably embodied in stiff fashion, while another plurality of the contact feet are preferably embodied in soft fashion in order to avoid overdetermination. Preferably, at least one of the contact feet is arranged on each of the arms. Preferably, at least one of the stiff contact feet and one of the soft contact feet are arranged on each of the arms.

The rear-side floating bearings are preferably at an identical distance from the intersection point of the directional axes. The rear-side floating bearings are preferably at an identical distance from the optical element. The rear-side floating bearings are preferably arranged further inward in a radial direction than the contact feet.

In preferred embodiments, the rear-side floating bearings enable the displacement between the attachment optical unit support and the support plate in each case on exactly one directional axis. The rear-side floating bearings thus each have exactly one degree of freedom.

The rear-side floating bearings preferably each comprise a first component embodied in the support plate, such as a groove, for example, which determines the directional axis of the respective rear-side floating bearing. The floating bearings preferably each comprise a second component embodied on the attachment optical unit support, such as, for example, a press-fit foot to be guided in the respective groove, a pin to be guided in the respective groove, or a rolling body guide.

The attachment optical unit support is preferably pressed against the support plate by at least one tensioning spring. The at least one tensioning spring is preferably formed by a clip spring.

DESCRIPTION OF THE DRAWINGS

Further details and developments of the invention will become apparent from the following description of one preferred embodiment of the invention, with reference being made to the drawing. In the figures:

FIG. 1 shows a support plate and a housing of one preferred embodiment of a spectrometer according to the invention;

FIG. 2 shows the support plate and an attachment optical unit of the spectrometer shown in FIG. 1;

DETAILED DESCRIPTION OF PREFERRED EMBODIMENTS

Figure 3:
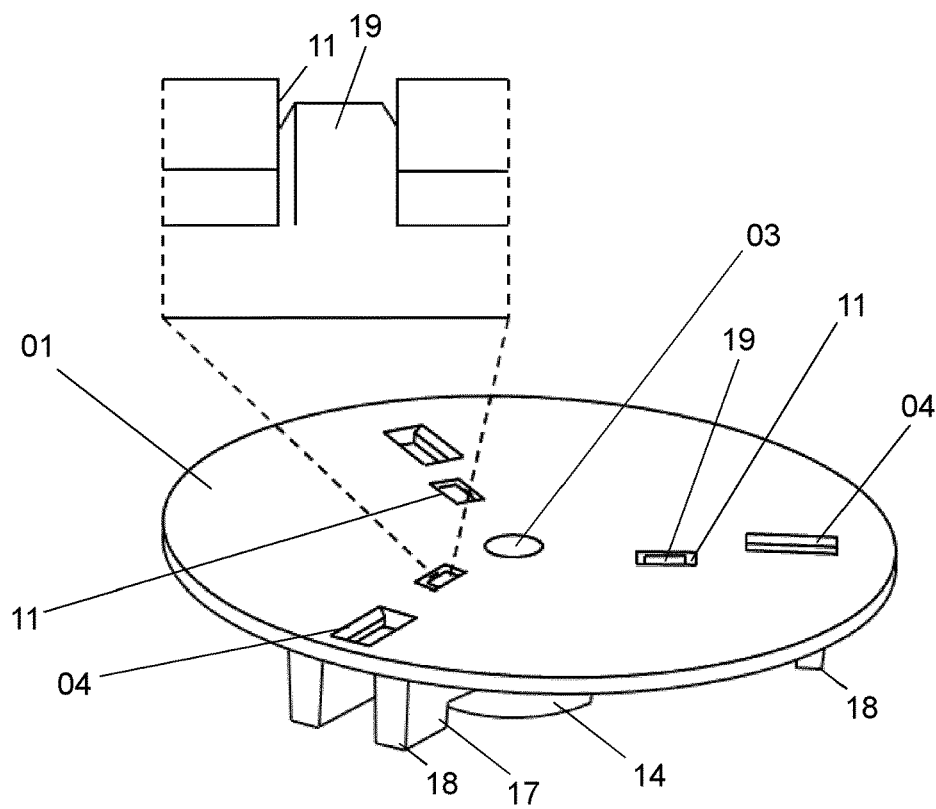
FIG. 3 shows the support plate with the attachment optical unit as shown in FIG. 2 in a further view with a detail illustration.

FIG. 1 shows a support plate 01 and a housing 02 of one preferred embodiment of a spectrometer according to the invention in a view from below in a non-assembled state, such that the support plate 01 and the housing 02 are illustrated next to one another. The support plate 01 consists of a steel and has the shape of a circular disk. The housing 02 consists of a polymer and has a conical tubular shape, a central axis of the tubular shape lying perpendicular to the plane of the drawing. An entrance slit 03 is arranged in the vicinity of the center of the support plate 01, through which entrance slit electromagnetic radiation to be analyzed by the spectrometer can pass. In addition, three front-side grooves 04 are embodied in the support plate 01, each of said grooves having an approximate V-shape and a respective cylindrical roller 06 (shown in FIG. 4) running in each of said grooves. In the assembled state of the spectrometer, the cylindrical rollers 06 (shown in FIG. 4) run between the front-side grooves 04 and cylindrical roller guides 07 embodied at the underside of the housing 01. The front-side grooves 04, the cylindrical rollers 06 (shown in FIG. 4) and the cylindrical roller guides 07 form front-side floating bearings for floating mounting of the housing 02 on the support plate 01, which each enable a displacement between the housing 02 and the support plate 01 on a directional axis 08. The directional axes 08 intersect at an intersection point 09 which is spaced apart from the entrance slit 03 by an offset measure. Each two adjacent directional axes 08 are at an angle of 120° with respect to one another.

In addition, three rear-side grooves 11 are embodied in the support plate 01, these grooves being described in more specific detail with reference to FIG. 2.

The conical tubular shape of the housing 02 has an inner surface 12. The spectrometer furthermore comprises an imaging grating (not shown) for diffracting the electromagnetic radiation that has entered, which grating covers the conical tubular shape of the housing 02. The spectrometer furthermore comprises a detector (not shown) for detecting the diffracted electromagnetic radiation, said detector extending in one direction and being arranged in the housing 02 on the support plate 01. The housing 02 is pressed onto the support plate 01 by a tensioning spring (not shown).

FIG. 2 shows the support plate 01 and an attachment optical unit 14 of the spectrometer shown in FIG. 1 in a view or in a sectional view from below in a non-assembled state, such that the support plate 01 and the attachment optical unit 14 are illustrated next to one another. The attachment optical unit 14 comprises an optical element 16 and an attachment optical unit support 17. The attachment optical unit support 17 consists of a polymer and has 3 arms 18. A press-fit foot 19 is arranged on each of the arms 18 and, in the assembled state of the spectrometer, is pressed into one of the rear-side grooves 11 in the support plate 01. The rear-side grooves 11 and the press-fit feet 19 form rear-side floating bearings for floating mounting of the attachment optical unit 14 below the support plate 01, which each enable a displacement between the attachment optical unit support 17 and the support plate 01 on a directional axis 21. The directional axes 21 intersect at an intersection point 22 at which the optical element 16 is arranged. Each two adjacent directional axes 21 are at an angle of 120° with respect to one another. A stiff contact foot 23 and a soft contact foot 24 are arranged on each of the arms 18. In the assembled state, the attachment optical unit support 17 rests on the support plate 01 by way of the stiff contact feet 23 and by way of the soft contact feet 24.

FIG. 3 shows the support plate 01 with the attachment optical unit 14 as shown in FIG. 2 in a perspective view with a detail illustration of one of the rear-side grooves 11 and the press-fit foot 19 press-fitted therein. The support plate 01 and the attachment optical unit 14 are illustrated in an assembled state.

Figure 4:
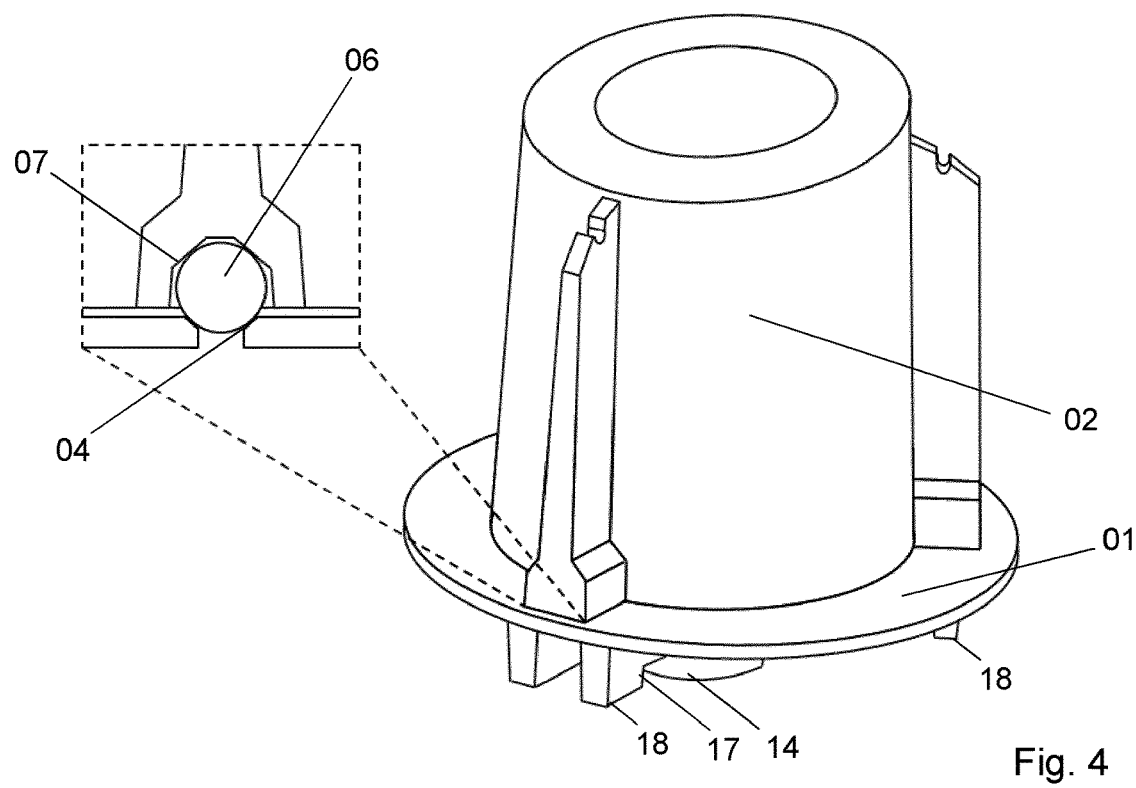
FIG. 4 shows the support plate with the housing and the attachment optical unit as shown in FIG. 1 and FIG. 2 in a further view with a detail illustration.

FIG. 4 shows the support plate 01 with the housing 02 and the attachment optical unit 14 as shown in FIG. 1 and FIG. 2 in a further few with a detail illustration of one of the front-side grooves 04, of the cylindrical roller 06 running therein, and of the cylindrical roller guide 07 guiding said cylindrical roller 06. The support plate 01, the housing 02 and the attachment optical unit 14 are illustrated in an assembled state.

The invention claimed is:

1. A spectrometer for spectral analysis of electromagnetic radiation, comprising:
    an entrance slit for entrance of the electromagnetic radiation to be analysed;
    an imaging grating for diffracting the electromagnetic radiation that has entered;
    a detector for detecting the diffracted electromagnetic radiation, said detector extending at least in one direction;
    a support plate, in which the entrance slit is arranged;
    a housing mounted on the support plate, said housing covering the detector and the entrance slit and supporting the imaging grating; and
    at least three floating bearings for floating mounting of the housing on the support plate, the floating bearings each enabling a displacement between the housing and the support plate (01) on a directional axis, and the floating bearings being distributed around a central axis of the housing.

2. The spectrometer as claimed in claim 1, wherein the housing consists of a plastic, and in that the support plate consists of a metal.

3. The spectrometer as claimed in claim 1, wherein the housing has a tubular shape, a central axis of the tubular shape being aligned perpendicular to the support plate, the tubular housing being closed by the support plate on a first side surface of the tubular housing, and the tubular housing being closed by the grating on a second side surface of the tubular housing situated opposite the first side surface.

4. The spectrometer as claimed in claim 1, wherein the directional axes of the floating bearings intersect at an intersection point.

5. The spectrometer as claimed in claim 4, wherein the intersection point at which the directional axes of the floating bearings intersect lies on a central axis of the housing or is spaced apart from the central axis of the housing by an offset measure which is smaller than one quarter of a radius of the housing.

6. The spectrometer as claimed in claim 4, wherein the floating bearings are arranged outside the housing and are at an identical distance from the intersection point of the directional axes.

7. The spectrometer as claimed in claim 4, wherein the floating bearings are arranged in a manner distributed uniformly around the intersection point of the directional axes, one of the floating bearings being arranged offset from the uniform distribution by at most a coding distance.

8. The spectrometer as claimed in claim 1, wherein the floating bearings each have exactly one degree of freedom.

9. The spectrometer as claimed in claim 1, wherein the floating bearings each comprise a groove and a rolling body mounted in the groove, the grooves being embodied in the support plate.

10. The spectrometer as claimed in claim 9, wherein the grooves are embodied in U-shaped or V-shaped fashion.

11. The spectrometer as claimed in claim 9, wherein the rolling bodies (06) consist of a steel.

12. The spectrometer as claimed in claim 9, wherein the rolling bodies and/or the grooves have a coating.

13. The spectrometer as claimed in claim 9, wherein the housing is pressed against the support plate by at least one tensioning spring, as a result of which the rolling bodies are pressed into the grooves.

14. The spectrometer as claimed in claim 1, further comprising an attachment optical unit arranged on the rear side of the support plate (01) situated opposite the housing, the attachment optical unit comprising an optical element arranged upstream of the entrance slit and an attachment optical unit support, which supports the optical element, the attachment optical unit support being mounted on the support plate, the spectrometer furthermore comprising at least three rear-side floating bearings for floating mounting of the attachment optical unit support on the support plate, the rear-side floating bearings each enabling a displacement between the attachment optical unit support and the support plate on a directional axis, and the rear-side floating bearings being distributed around a central axis of the attachment optical unit support.

15. The spectrometer as claimed in claim 14, wherein directional axes of the rear-side floating bearings intersect at an intersection point at which the optical element of the attachment optical unit lies.

* * * * *